United States Patent Office 2,921,857
Patented Jan. 19, 1960

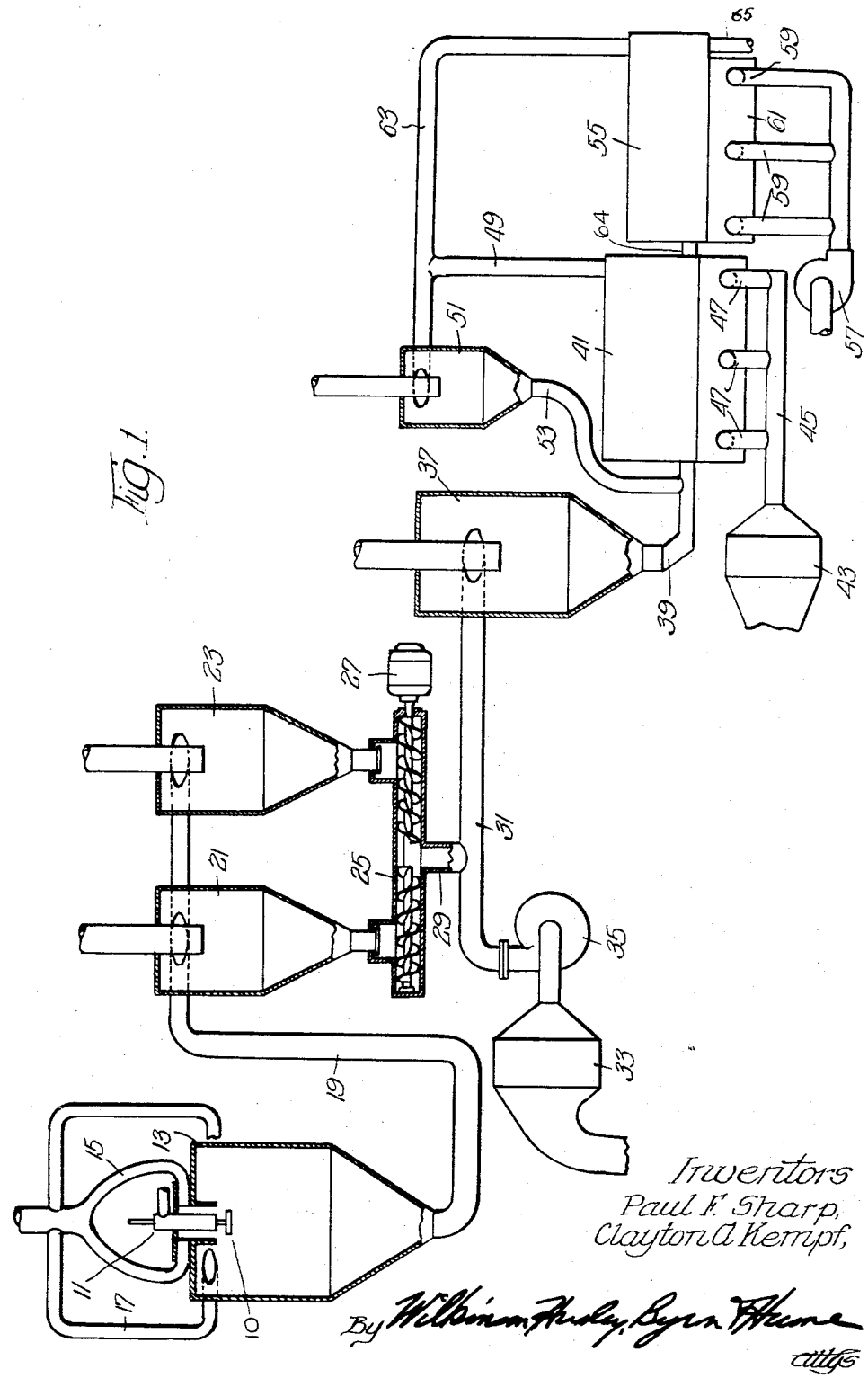

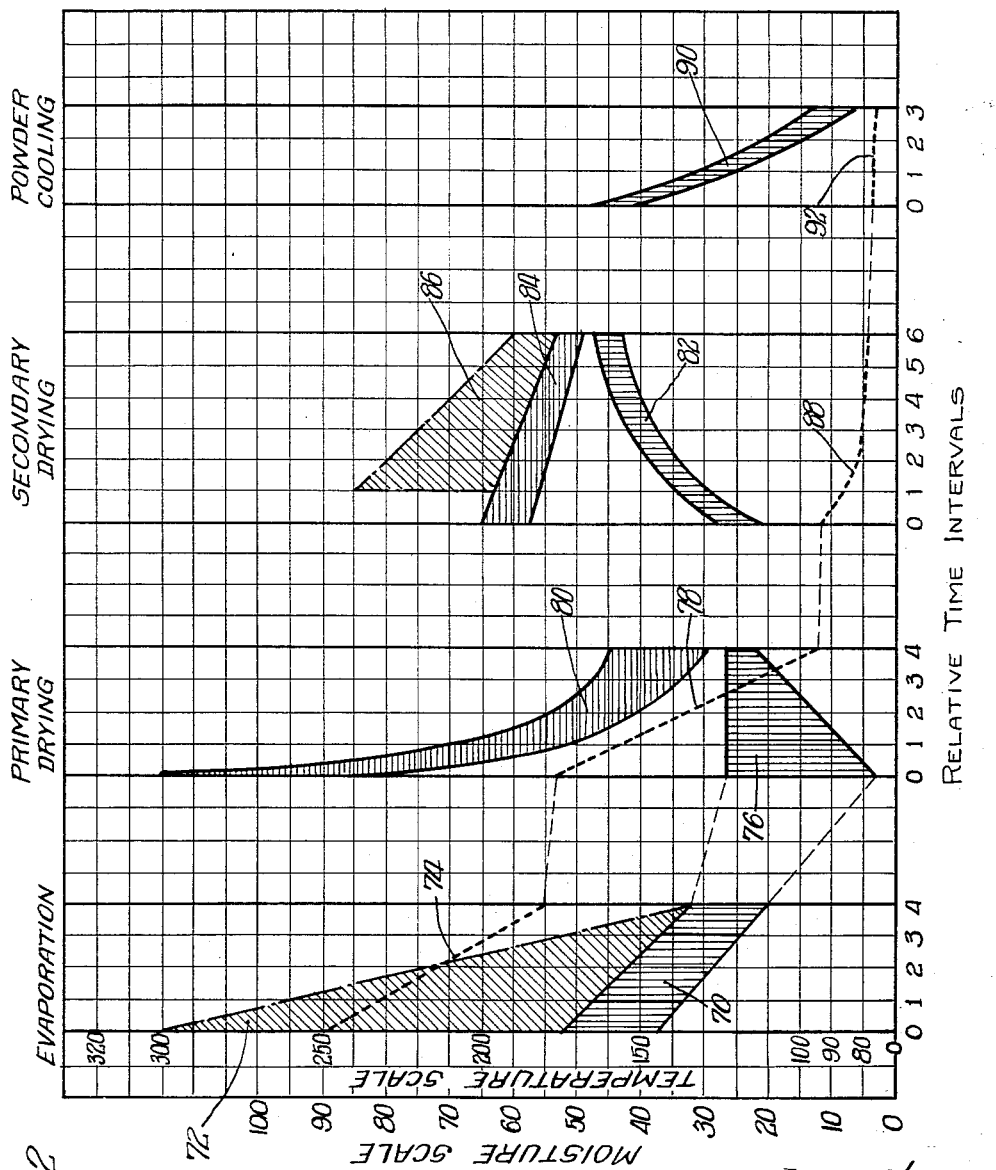

2,921,857

METHOD FOR THE PREPARATION OF A POWDERED MILK PRODUCT

Paul F. Sharp and Clayton A. Kempf, Berkeley, Calif., assignors, by mesne assignments, to Dairy Foods Incorporated, Los Angeles, Calif., a corporation of California Application April 8, 1957, Serial No. 651,506

7 Claims. (Cl. 99—203)

This invention relates to a new and improved method for the preparation of a powdered milk product, and more particularly to an essentially dry milk powder. This powder comprises finely divided material, a major portion of which consists in clumps or agglomerations of a plurality of individually formed particles. The powder and clumped groups are formed by a spray drying operation.

The process relates to the preparation of an essentially dry milk product and is applicable to the production of whole milk and skim milk as well as other powders derived from milk which contain milk lactose and protein.

This appliaction is a continuation-in-part of copending application Serial No. 554,862, filed December 22, 1955, and entitled "Method for the Preparation of a Powdered Milk Product," now abandoned.

An important feature of the present invention lies in the fact that the product of the process wets rapidly and reconstitutes quickly as a liquid milk product when introduced into water. The product makes a reconstituted milk of better quality if at least a substantial portion of the lactose content is present in the form of identifiable alpha lactose hydrate crystals as defined in the patent of Paul F. Sharp, No. 2,728,678, issued December 27, 1955. A substantial portion, however, of the lactose is preferably present in the glass form at the end of the initial spraying operation, as these glass form particles are tacky at the preferred moisture concentration and take a major part in the clumping of the particles.

It is an object of the present invention to provide a new and improved process for the preparation of an essentially dry milk powder.

It is a further object to provide a process in which there is a controlled clumping of the milk powder particles.

It is an additional object to provide a process involving an initial spray drying operation during which the powder is reduced to an intermediate moisture content followed by one or more additional drying steps by means for which the powder is brought to the desired final moisture content.

It is another object to provide a process in which the concentrate is seeded with minute lactose crystals to an extent such that a substantial portion of the particles produced by the initial spray drying stage contain alpha lactose crystals.

It is also an object to provide a process including as an initial step a spray drying stage where a substantial portion of the particles contain glass lactose at a moisture content such that the particles agglomerate with the simultaneously formed alpha-lactose crystal-containing particles to form clumps.

It is a further object to provide a process in which one or more drying steps subsequent to the initial spray drying step serve to reduce the moisture content to the desired level without destruction of the desired clump formation.

Other and further objects will appear as the description proceeds.

We have described the invention in connection with the accompanying drawings, in which—

Figure 1 is a somewhat diagrammatic layout of apparatus suitable for carrying out the invention; and Figure 2 is a diagrammatic showing of the relationship between temperature and moisture content at various stages of the process.

Referring first to Figure 1, the milk concentrate, which preferably has been substantially seeded with lactose crystals, is fed through inlet 11 into the atomizer 10. At the same time, air in the range of temperatuers preferably from 240° F. to 300° F. is fed through pipes 15 adjacent the atomizer elements while additional air may be fed through pipe 17 tangentially into the atomizer chamber. The powder produced in the chamber has a preferred moisture content of not above 18%. It has been found that moisture concentrations of 20% or above tend to cause the powder to fuse in undesirably large masses.

This powder is drawn off from the bottom of the atomizer chamber 13 through passage 19, which passage is divided so that the material is passed to the pair of similar collecting or separating cyclones 21 and 23 tangentially at the upper part of the cyclone chamber. The powder drops from the bottom of the cyclones 21 and 23 into the divided scroll conveyor 25, shown as driven by motor 27. The scroll conveyor carries the powder from the two cyclones toward the center of the conveyor from which it discharges through passage 29 into passage 31. The powder at this point preferably has a moisture content of approximately 12% or 13%.

The passage 31 carries heated air at a temperature preferably within the general range of 185° F. to 200° F., the air being heated by a radiator 33 and moved by fan 35. Passage 31 discharges tangentially into the upper portion of cyclone 37 and the powder, after this secondary drying, falls to the bottom of the cyclone 37 and is discharged through passage 39. At this point, the powder has a preferable moisture content of the order of 8% to 9%.

From passage 39, the powder passes into a tray type drier 41, this drier being heated by air passed through radiator 43 through header 45 and passages 47 discharging below the trays in the drier. This air may have a temperature of the order of 240° F. The air passing through the trays in the drier discharges upwardly through passage 49 into cyclone 51. The entrained milk particles from the cyclone 51 are passed downwardly through passage 53 and are returned to the tray drier through passage 39. The particles of the powder are discharged from the tray drier 41 through passage 64 to a tray cooler 55. In this tray cooler the material is cooled by air forced by blower 57 through passages 59 to the manifold 61 located below the tray drier. A small portion of finely divided material from the tray drier is carried off through passage 63 joining passage 49 and leading into the cyclone 51. From the tray cooler 55 the powder passes out through passage 65 to storage. Preferably, at this point the material has a moisture content of the order of from 2% to 3% for whole milk and from 3% to 4% for non-fat milk.

In the initial drying in the spray drier there will be a substantial percentage of lactose in the glass state. This lactose will be somewhat tacky at the moisture content present in this stage, and the particles will tend to agglomerate due to this tackiness. A substantial proportion of the particles, due to the seeding of the concentrate introduced into the spray drier, may include substantially all of their lactose as alpha lactose hydrate crystals, which will not be tacky at the moisture concentration present. The different types of particles, however, will be fully intermingled and a substantial portion of non-tacky particles will become agglomerated with the tacky particles. The moisture content of the particles as they pass into the secondary drying cyclone 37 and as they pass from that cyclone will be sufficient so that the agglomerations will not be broken down in size beyond the desired level. The tray drying stage has no substantial action in breaking down agglomerations and, therefore, even though the product at the moisture content reached at this stage is no longer tacky, the desired agglomeration will be maintained.

Apparatus similar to that illustrated in Figure 1 but somewhat modified may also be employed. For instance, the fines which pass from the try type drier 41 through pipe 49 and the cooler 55 through pipe 63 may be returned to the main drying chamber 13 instead of to the cyclone 51. These fines may be introduced through a tangential inlet pipe in any portion of the chamber 13 or they may be returned to any selected portion of the pipe 19 passing from the bottom of the atomizer chamber 13 and the cyclone 21. In addition, one cyclone of adequate size may be substituted for the two cyclones 21 and 23. A further change that may be made is that the product may be fed by a suitable mechanical conveyor from the bottom of the cyclones 21 and 23, or from the bottom of a single cyclone if such is employed, directly to a suitable tray type drier such as 41. If a direct passage to the tray type drier 41 is employed as indicated, then the tray drier 41 will be sufficiently enlarged to accomplish the desired degree of tray drying.

The diagram of Figure 2 shows the relationship of time and temperature as well as moisture content throughout the several stages of the process. Referring first to the left-hand portion of the figure, the vertically hatched area 70 indicates the product temperatures within a suitable range when the process is operated under low heat conditions. This area indicates an initial temperature range of the order of from 145° F. to 175° F. This stage is shown as taking a proportionate time interval at the termination of which the temperature of the product is within a range of from 110° F. to 135° F. If the process is operated under high temperature conditions, the product temperature may range as high as 300° F. as indicated by the diagonally hatched area 72. The broken line, designated by reference character 74, indicates the moisture content of the product which is shown here as ranging from approximately 88% down to a terminal moisture content of 55% at the end of the evaporation stage. The above relates to a single step evaporation. It is equally feasible to evaporate first to a light concentrate stage, followed by a second evaporation to produce a concentrate of the order shown.

At the end of the evaporation stage, the concentrate will be seeded with lactose crystals before being introduced into the spray drier. This seeding may take place without cooling. On the other hand, as indicated on Figure 2, the product temperature may be lowered substantially before introduction into the spray drier. The chart shows the introduction of the concentrate into the spray drier at a temperature which may range from 75° F. to approximately 125° F. It is to be understood that the amount of seeding may vary according to the temperature at which the seeded concentrate is introduced into the spray drier, a larger quantity of seed crystals being necessary at the higher temperatures.

The product temperature range in the primary drying step is shown by the vertically hatched area 76. The broken line, here designated 78, shows that the primary drying in the spray drier will reduce the moisture content from somewhat greater than 50% down to a content on the order of 12%. The horizontally cross hatched area 80 indicates the air temperature during this primary drying in the spray drier. The air may have an inlet temperature into this stage of the order of from 300° F. down to the order of 240° F. and will leave the stage at temperatures of the order of from 127° F. to 160° F.

The portion of the chart showing the secondary drying also includes the tertiary drying or drying in the tray or pan drier 41. The product temperature, here indicated by the vertically hatched area 82, rises from a range of from approximately 112° F. through 128° F. to a range of approximately 155° F. to 165° F. at the termination of the final drying. The air temperature indicated by the horizontal cross hatching area 84 for the secondary drying ranges from an air inlet temperature generally from 185° F. to 200° F. to an air discharge temperature ranging from approximately 158° F. to 168° F.

The diagonally hatched area designated 86 indicates the air temperatures and tertiary drying in the tray drier, these temperatures being above those of the secondary drying and ranging from an inlet temperature as high as approximately 240° F. down to a discharge temperature on the order of 190° F. In this section of the chart, it is to be noted that the secondary drying takes a shorter period of time than the tertiary drying.

In these last two drying stages, the product moisture content indicated by the broken line 88 is brought down from moisture content generally of the order of 12% to a moisture content of the order of 2% to 5%. The right section of the chart shows the product temperature, indicated by area 90, dropped from an initial temperature range of the order of 150° F. to 165° F. down to a final temperature of the general order of from 85° F. to 95° F.

It will be understood that the various indications of the chart on Figure 2 are subject to modifications depending on the character of the concentrate being treated and on other variable factors. In general, for example, the moisture concentration may be somewhat lower in the treatment of whole milk throughout the various stages than in the treatment of skim milk. The chart, therefore, is illustrative of a series of characteristic operating conditions, but is not intended to be limiting since conditions may require reasonable variations from the figures and areas shown as to times, temperatures, and moisture content.

The third or tertiary drying stage is shown and described as being carried out in a tray drier rather than in a cyclone or vortex type of drier. This has been found important in maintaining the integrity of the clumped particles. Due to the low moisture content of the material in this stage of the process, this type of handling is important in preventing substantial breaking down of the clumps.

There is a minor breaking down of the clumps during the process. However, as shown in the drawing, Figure 1, these fines are carried off from the tray drier 41 through passage 49 and from the cooler 55 through passage 63 and returned to the material in passages 53 and 39. It has been found possible to return these fines to earlier stages of the process.

The most direct means of characterizing the product is to relate the product to its ability to be retained on or to be passed through standard screens. For this purpose, we refer to standard Tyler screens. We find that for desired properties we can control the product so that the major portion will pass through a standard 12-mesh Tyler screen and be retained upon a standard 100-mesh Tyler screen.

While it is possible, and sometimes desirable, to control the process to give a somewhat narrower range of clump-size, we find that for most purposes the above range is adequate. The finished product is passed over an apparatus which serves to screen the product in a manner equivalent to the combination of the two above screen sizes. Ordinarily, in good operation the fraction of the product not passing through the 12-mesh screen will be almost negligible. Likewise, that quantity passing through the 100-mesh screen will be quite small in relation to the total product.

One preferred method of carrying out this invention is as follows: Concentrated non-fat milk was prepared containing 47% total solids. This concentrate was seeded according to the method of Sharp Patent No. 2,728,678, using seed lactose. The seeded concentrate was fed to the atomizer through a tubular heat exchanger to permit control of the temperature up to a temperature of 125° F. if desired (as shown under Primary Drying Stage area 76 of Figure 2). The air velocities and volumes used in the primary drier were the same as those used for conventional drying. The temperature was 290° F. The adjustment of the feed rate of the concentrate was made rapidly to bring the air outlet temperature of the primary drier down to about 145° F. At this temperature, the intermediately dried product, starting from the discharge of cyclones 21 and 23 of Figure 1, was not quite sufficiently clumped so the feed was increased slightly more to lower the discharge air temperature to 135° F. At this temperature, the clumping was found to be quite satisfactory and the feed rate was held at that setting. (When the clumps appear quite fragile, the temperature of the seeded concentrate is warmed two to three degrees at a time until the satisfactory durability is secured.)

In this example, the concentrate temperature to the atomizer was 120° F., the outlet air temperature from the primary drier 135° F., and the temperature of the product coming from the cyclones 21 and 23 was 115° F. The moisture of the clumped product at this point was 13%. The product at 13% moisture was fed continuously through the scroll 25 into the short duct 29 into the longer duct 31 through which it is moved by secondary drying air at 190° F. into cyclone 37. The air leaving the top of cyclone 37 was found to have a temperature of 160° F. The product leaving the bottom outlet of cyclone 37 was found to have a moisture content of 8%. The product at 8% moisture was fed through duct 39 into the tray drier 41 where it was contacted by drying air at a temperature of 230° F. imparted to the air by radiator 43. The product passed from the tray drier at a moisture content of less than 5% and at a temperature of 160° F. From the tray drier, this product passed into the tray cooler 55 supplied with cooling air by fan 57. The dried and cooled product leaving the tray cooler through discharge pipe 65 was found to have a temperature of 90° F. and a moisture content of 4%. The finished product so obtained displayed spontaneous wetting to a unique degree, which is attributable to the clumped characteristics. The product did not differ from that of Sharp's Patent No. 2,728,678 in any other respect.

The finished product so obtained had the properties of the product made according to Sharp Patent No. 2,728,678, but with the additional advantage that the finished product consisted of clumped primary spray dried particles of a size such that 95% of the finished product passed through a 12-mesh standard Tyler screen and remained upon a 100-mesh standard Tyler screen, and possessed the property of instantly and spontaneously wetting with water.

We have described a centrifugal atomizer and a conically shaped primary drying chamber in our discussion of the equipment that may be employed in the practice of our invention. We have found that other types of equipment may be used for the primary drying stage. For example, we have used a box type drier with pressure spray atomizers and with continuous removal of the product from the floor by means of a drag. The product coming from the floor of such a primary drier is fed continuously to the equipment for the secondary and tertiary drying stages.

While we have shown and described certain preferred methods of carrying out our improved process, it will be understood that it is capable of variation to meet differing conditions and requirements, and we therefore contemplate such modifications as come within the spirit and scope of the appended claims.

In the appended claims, the term "an essentially dry milk powder" includes both whole milk and skim milk powders, as well as other powders derived from milk which contain milk lactose and protein.

What is claimed is:

1. The method of producing, without rewetting, an essentially dry milk powder having essentially all of its mass in the form of agglomerated primary spray-dried particles, and possessing essentially complete solubility, which comprises the steps of rapidly moving droplets of lactose seeded milk concentrate formed by spraying a milk concentrate containing a predetermined quantity of lactose seed crystals, through an atmosphere of hot drying gas, providing a temperature for said gas in relation to the lactose seed content of said concentrate that will reduce the moisture content of such droplets to from 10% to 18% at a time during said drying procedure when both crystalline lactose and non-crystalline lactose are present in said droplets, intermingling the particles produced from said droplets to bring adjacent particles in contact with each other during the period when moisture content thereof is between 10% and 18%, thereby causing essentially all of the particle mass to become firmly associated into agglomerates of particles bonded to each other by the tackiness of the non-crystalline lactose present therein, and, while the particles are so bonded, removing additional moisture therefrom to below substantially 5% and thereby strengthening said bonds and producing a dry milk powder composed of agglomerated particles.

2. The method of claim 1, in which the clumped particles are of a size such that the major portion thereof will pass through a 12-mesh screen and be held on a 100-mesh screen.

3. The method of claim 1, in which the particles are passed through a secondary drying stage in which the moisture content is reduced to the order of from 7% to 10%.

4. The method of claim 1, in which the particles are passed continuously from the spray drying stage to a secondary drying stage in which the moisture content is reduced to the order of from 7% to 10%.

5. The method of claim 1, in which the particles are passed through a secondary drying stage in which the moisture content is reduced to the order of from 7% to 10%, and in which the particles are thereafter passed through a third drying stage in which the moisture content is reduced to the order of from 2% to 5%.

6. The method of claim 1, in which the particles are passed through a secondary drying stage in which the moisture content is reduced to the order of from 7% to 10%, and in which the particles are thereafter passed through a third drying stage in which the moisture content is reduced to the order of from 2% to 5%, said third drying stage being carried out under conditions such as to substantially maintain the integrity of the clumped particles.

7. The method of claim 1, in which the particles are passed through a secondary drying stage in which the moisture content is reduced to the order of from 7% to 10%, and in which the particles are thereafter passed through a third drying stage in which the moisture content is reduced to the order of from 2% to 5%, said third drying stage being carried out under conditions such as to substantially maintain the integrity of the clumped particles, the clumped particles being of a size such that the major portion thereof will pass through a 12-mesh screen and be held on a 100-mesh screen.

References Cited in the file of this patent

UNITED STATES PATENTS

| | | |
|---|---|---|
| 2,016,592 | Chuck | Oct. 8, 1935 |
| 2,312,474 | Peebles | Mar. 2, 1943 |
| 2,627,463 | Meade | Feb. 3, 1953 |
| 2,661,294 | Meade | Dec. 1, 1953 |

UNITED STATES PATENT OFFICE

CERTIFICATE OF CORRECTION

Patent No. 2,921,857 January 19, 1960

Paul F. Sharp et al.

It is hereby certified that error appears in the printed specification of the above numbered patent requiring correction and that the said Letters Patent should read as corrected below.

Column 1, line 28, for "appliaction" read -- application --; line 54, for "means for" read -- means of --; column 3, line 26, for "the try" read -- the tray --.

Signed and sealed this 5th day of July 1960.

(SEAL)
Attest:

KARL H. AXLINE
Attesting Officer

ROBERT C. WATSON
Commissioner of Patents